(12) United States Patent
Hunt

(10) Patent No.: US 6,239,832 B1
(45) Date of Patent: May 29, 2001

(54) TELECINE SYSTEMS

(75) Inventor: Stuart William Arundell Hunt, Hertfordshire (GB)

(73) Assignee: Innovation TK Limited, Hertfordshire (GB)

( * ) Notice: Subject to any disclaimer, the term of this patent is extended or adjusted under 35 U.S.C. 154(b) by 0 days.

(21) Appl. No.: 09/115,923

(22) Filed: Jul. 15, 1998

(30) Foreign Application Priority Data

Jul. 15, 1997 (GB) .................................................. 9714870

(51) Int. Cl.$^7$ ............................. H04N 5/253; H04N 9/11
(52) U.S. Cl. ................................................. 348/96; 348/97
(58) Field of Search ...................... 348/96–109, 195–196, 348/201, 206

(56) References Cited

U.S. PATENT DOCUMENTS

| | | | |
|---|---|---|---|
| 3,742,277 | * | 6/1973 | Peters ..................................... 313/467 |
| 3,833,756 | * | 9/1974 | Kumagai et al. ...................... 348/101 |
| 4,733,088 | * | 3/1988 | Yamada et al. ...................... 250/483.1 |
| 5,712,486 | * | 1/1998 | Soltani et al. ...................... 250/484.4 |

FOREIGN PATENT DOCUMENTS

| | | | |
|---|---|---|---|
| 25 25 073 A1 | 12/1975 | (DE) | ................................ H04N/5/36 |
| 1 566 910 | 5/1980 | (GB) | ................................ H04N/9/11 |
| 2 235 602 | 3/1991 | (GB) | ............................. H04N/5/202 |
| 2 314 988 | 1/1998 | (GB) | ................................ H04N/3/36 |
| 2327314 | * 1/1999 | (GB) | ............................. H04N/5/253 |

OTHER PUBLICATIONS

Antonuk et al, "Thin–Film, Flat–Panel, Composite Detectors For Projection and Tomographic Imaging", Conference Record of Nuclear Science Symposium and Medical Imaging Conference, vol. 2, pp. 1065–1067, 1992.*

Doyle et al, "The Influence of High Scanning Frequencies on the Luminescence Saturation Properties of Phosphors for CRT Projection Systems", IEEE Trans. on Electron Devices, vol. 36, No. 9, Sep. 1989 pp. 1876–1881, Sep. 1999.*

* cited by examiner

*Primary Examiner*—Vu Le
(74) *Attorney, Agent, or Firm*—McDonnell Boehnen Hulbert & Berghoff

(57) ABSTRACT

A telecine system comprises a cathode ray tube 2 with a mixed phosphor 6. The phosphor 6 is composed of phosphor components each having a distinct spectral output. Primary photodetectors 16,20,22 are arranged to detect light from the cathode ray tube 2 which has been modulated by a film 10 and produce primary electrical signals including information about the color content of the modulated light. Secondary photodetectors 26a–26c detect unmodulated light from the cathode ray tube 2 and produce secondary electrical signals including information about the color content of the unmodulated light. The primary signals are divided by the secondary signals in a signal processor 28 to compensate for inhomogenities in the mixed phosphor 6.

9 Claims, 5 Drawing Sheets

TELECINE SYSTEMS

FIELD OF THE INVENTION

The present invention relates to the conversion of colour film images into corresponding electrical signals, and in particular to the conversion of cinematographic film into video signals, for example using a telecine machine.

BACKGROUND TO THE INVENTION

Telecine machines are well known. Examples of such machines include the "URSA Diamond" manufactured by Cintel International Limited in Ware, England and the FDL 90 manufactured by Broadcast Television Systems (BTS) in Darmstadt, Germany. The URSA Diamond is the latest in the URSA series of telecines, which represent the most commonly used "flying spot" telecine machines. In a flying spot telecine, a spot of light (the "flying spot") is produced on the face of a cathode ray tube (CRT) by bombarding the phosphor on the inside of the CRT face with a beam of electrons. The beam of electrons is controlled so that the flying spot traces a raster pattern across the face of the CRT. The light from the CRT is directed through a film frame and is detected after it has passed through the film frame by a photodetector. The photodetector produces an electrical signal corresponding to the intensity of the received light. In a colour telecine, photodetectors are provided corresponding to each of the primary colours of light, i.e. red, green and blue, to produce electrical signals corresponding to the detected intensity of each of these components. As the flying spot moves across the face of the CRT, and thus across the film frame, the electric signals from the photodetector(s) are sampled at each position of the spot to build up a set of signals corresponding to the colour transmission of the film frame, and thus the image on the film.

Known flying spot telecine machines use a single phosphor which has a relatively narrow spectral output across the wavelengths of the visible spectrum. The light from the CRTs of such telecines is generally greenish yellow and has little blue or red content. This means that the average level of detected red or blue light transmitted by the film will be lower than the average level of the detected green light, resulting in a low signal-to-noise ratio (SNR) in the red and blue channels.

SUMMARY OF THE INVENTION

In an attempt to overcome the disadvantages of a single phosphor described above, we have investigated the possibility of using a mixed phosphor to increase the red and blue content of the light from the CRT. A mixed phosphor contains a mixture of more than one phosphor, each phosphor capable of emitting light over a different region of the visible spectrum. However, when a phosphor is deposited on the inside of the face of a CRT, it forms a granular structure. Different phosphors exhibit structures of different granularity. We believe that unfavourable results would be achieved with a mixed phosphor CRT, due to the differences in the respective grain sizes of the phosphors in the mixed phosphor. In particular there could be a problem with the grain size of the blue phosphor. This would provide unacceptable variations in luminance within the blue range across the face of the CRT.

According to a first aspect of the present invention, there is provided, apparatus for the conversion of colour film images to corresponding electrical signals comprising:

a cathode ray tube provided with a phosphor composed of at least two phosphor components each having a distinct spectral output;

primary photodetector means arranged to detect light produced by the cathode ray tube, which light has been modulated by a film, and to produce primary electrical signals including information about the colour content of the detected light;

secondary photodetector means arranged to detect light produced by the cathode ray tube, which light has not been modulated by the film, and to produce secondary electrical signals including information about the colour content of the detected light corresponding to the emission from each phosphor component of the mixed phosphor; and processing means for adjusting the primary electrical signals with reference to the secondary electrical signals.

Mixed phosphors have not generally been used in telecine applications as each of the two phosphors will have a different granularity, such that the light from the face of the CRT will be uneven not only in intensity but also in colour composition. The apparatus according to the invention utilises secondary photodetector means to produce modulating signals responsive to the colour of the light emitted by the CRT, and this can be used to compensate for the effects of differential grain size in the mixed phosphor. Because the grain size generally is related to the colour of the phosphor, modulation of the primary signal on the basis of the colour of the unmodulated light from the CRT is an effective method of compensating for the effect of differential grain size in the mixed phosphor. In preferred arrangements, the light output in the red and blue regions is greatly improved compared to the single phosphor. As more light is produced by the mixed phosphor in these regions, more light passes through the scanned film and thus the SNR of the red and blue video signals is higher compared to that for a single phosphor.

According to a second aspect of the present invention, thee is provided a method of converting colour film images to corresponding electrical signals, wherein light from a mixed phosphor cathode ray tube, which light has been modulated by a film, is converted to primary electrical signals including information about the colour of the modulated light; light form the cathode ray tube which has not been modulated by the film is converted to secondary electrical signals including information about the colour of the unmodulated light; and the primary signals are modulated by the secondary signals.

The secondary electrical signals may be produced by one or more photodetectors, for example photomultipliers, which may be arranged to detect the intensity of a particular spectral region of light. In particular, it has been found that the blue phosphor component of a mixed phosphor has a considerably higher granularity than, for example green or red phosphors. Thus, at least a photodetector for detecting the intensity of the blue light from the CRT may be provided.

The photodetectors may be arranged to produce respective electrical signals corresponding to the intensity of the light emitted by respective phosphor components of the mixed phosphor. Conveniently, however, respective photodetectors may be provided corresponding to each of the conventional components of an RGB video signal, i.e. red, green and blue. In this way the processing of the secondary electrical signals with the primary electrical signals is simplified, as the primary electrical signal swill also generally be in the form of RGB components and thus a corresponding secondary signal is provided for each primary signal.

A convenient processing algorithm for the secondary and primary signals is to divide the primary signal by the magnitude of the secondary signal. This can be effected in the analogue or digital domain with suitable conversion of the primary and/or secondary signals as necessary.

In general, the primary and secondary electrical signals will be synchronised so that continuous processing of the signals can be achieved. Thus, corresponding primary and secondary electrical signals will be produced for each position of the flying spot on the CRT face and the primary signals will be modified according to the corresponding secondary signals.

The photodetectors for producing the secondary electrical signals may comprise a plurality of photodetectors for each colour component.

BRIEF DESCRIPTION OF THE DRAWINGS

Some embodiments of the invention will now be described by way of example only and with reference to the accompanying drawings, in which.

DESCRIPTION OF THE PREFERRED EMBODIMENT

Figure 1:
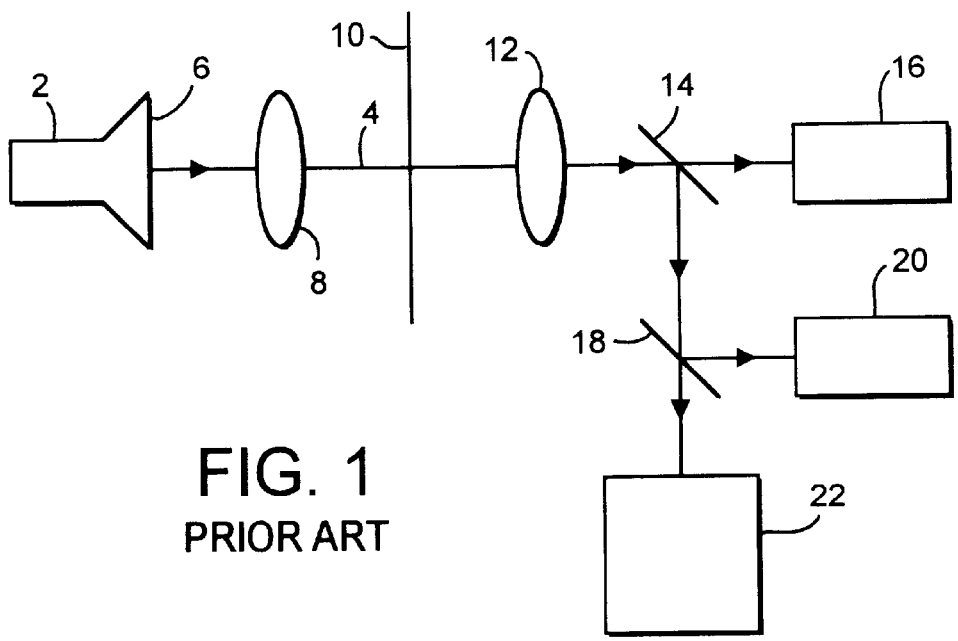
FIG. 1 is a schematic representation of a telecine system according to the prior art.

FIG. 1 shows a telecine system according to the prior art, such as the URSA Diamond manufactured by Cintel International Limited of Ware England. The system comprises a cathode ray tube (CRT) 2 which produces a beam of light 4 by bombarding a phosphor on the inner surface of its face 6 with a beam of electrons. The beam of light appears as a spot on the face 6 of the CRT 2 and thus this type of telecine is known as a "flying spot telecine". The light 4 is focussed by a first lens 8 towards the film 10 from which corresponding electrical signals are to be produced. As the light passes through the film, the dyes in the film absorb some of the light. In colour film, the different coloured dyes absorb varying degrees of each spectral component of the light 4. Thus, once the light has passed through the film 10 its colour content will have changed to correspond to the transmission characteristics of that point on the film through which the light 4 has passed.

The light 4 is focussed by a further lens 12 after it has passed through the film 10. The light 4 passes through a red dichroic mirror 14 which reflects green and blue light, but allows red light to pass through undeflected to a red photodetector 16. Similarly the light reflected by the red dichroic mirror 14 passes to a blue dichroic mirror 18 which reflects green light to a green photodetector 20 and allows blue light to pass undeflected to a blue photodetector 22. In this way the light 4 which has been modulated by the film 10 is split into its component colours (red, green and blue). Each component is detected by a respective photodetector 16, 20, 22 and converted to an electrical signal corresponding in magnitude to the intensity of the respective colour component transmitted by the film. The electrical signals can then be used to produce an analogue or digital RGB video signal.

Figure 2:
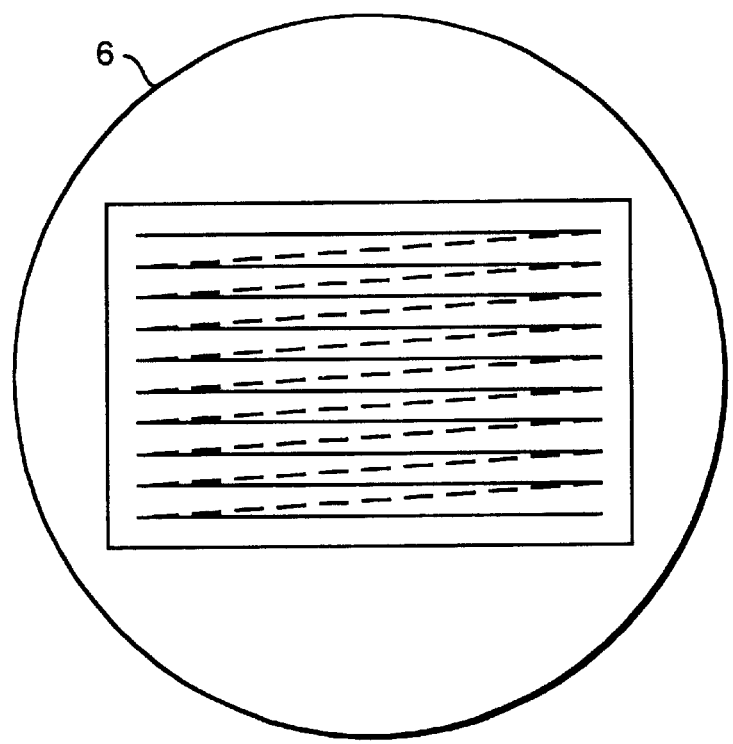
FIG. 2 is a schematic representation of the face of a cathode ray tube showing the raster pattern of the flying spot.

FIG. 2 shows schematically the raster pattern followed by the flying spot on the face 6 of the CRT 2. As can be seen, the spot moves from the upper left hand corner of the frame across the first line of the raster pattern until it reaches the right hand side of the frame. The spot then returns quickly to the left hand side of the next line of the scan and repeats this process until the entire frame has been covered.

Through the focussing lens 8, the beam of light 4 produced by the flying spot will scan the entire frame of the film 10 in this raster pattern. Thus, at each position of the spot, the output of each of the photodetectors 16,20,22 can be sampled to obtained the RGB colour component values of that position on the film frame.

Figure 3:
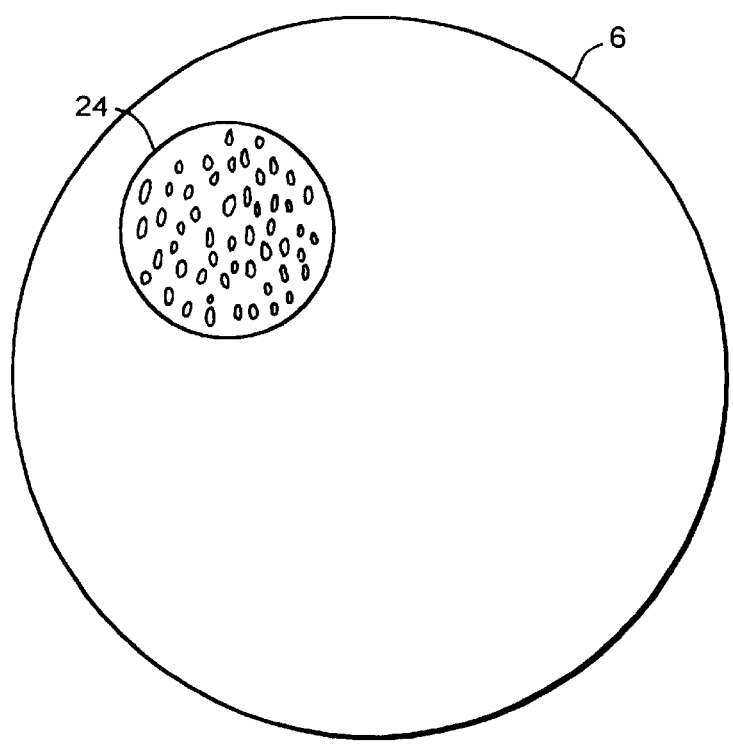
FIG. 3 is a schematic representation of the face of a cathode ray tube showing, in a partially enlarged view, the granularity of the phosphor coating.

FIG. 3 shows a magnified portion 24 of the face 6 of the CRT 2. As can be seen, the phosphor on the inside of the face 6 of the CRT 2 is made up of grains and thus the intensity of light produced by the phosphor is not constant across the face 6 of the CRT 2. Phosphors are commonly milled during manufacture to reduce the size of grains, but some granularity of the phosphor is inevitable.

Figure 4:
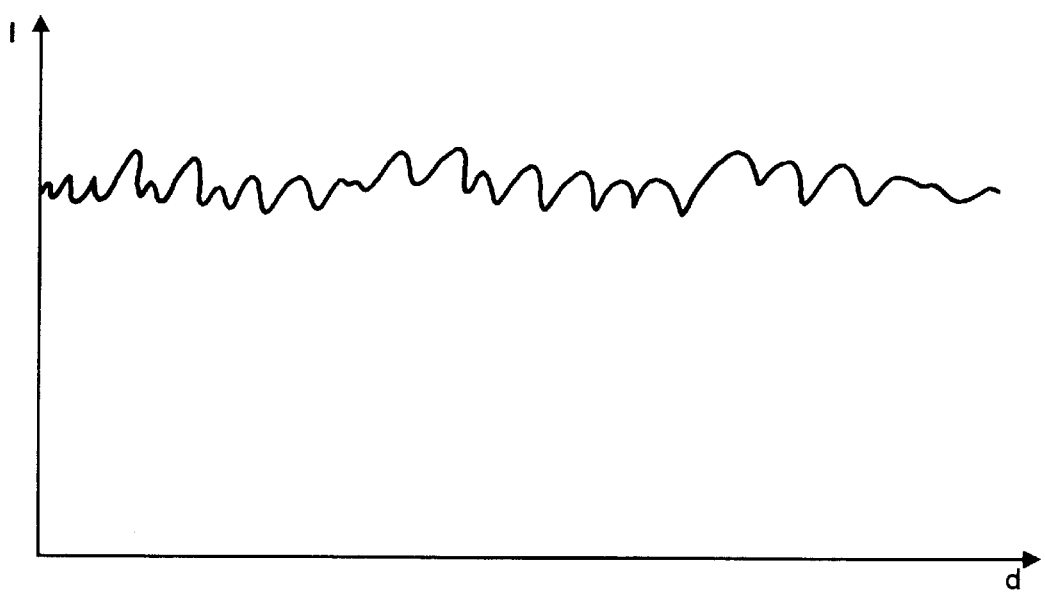
FIG. 4 is a schematic graph representing the variation in intensity of the light across the face of the cathode ray tube with distance.

FIG. 4 shows schematically the variation in the intensity I of the light produced by the phosphor as the spot moves across the face 6 a distance d from the left hand edge. As can be seen, peaks occur in the intensity when the centre of a phosphor grain is bombarded by the electron beam of the CRT and troughs appear when the electron beam bombards a gap between phosphor grains.

Figure 5:
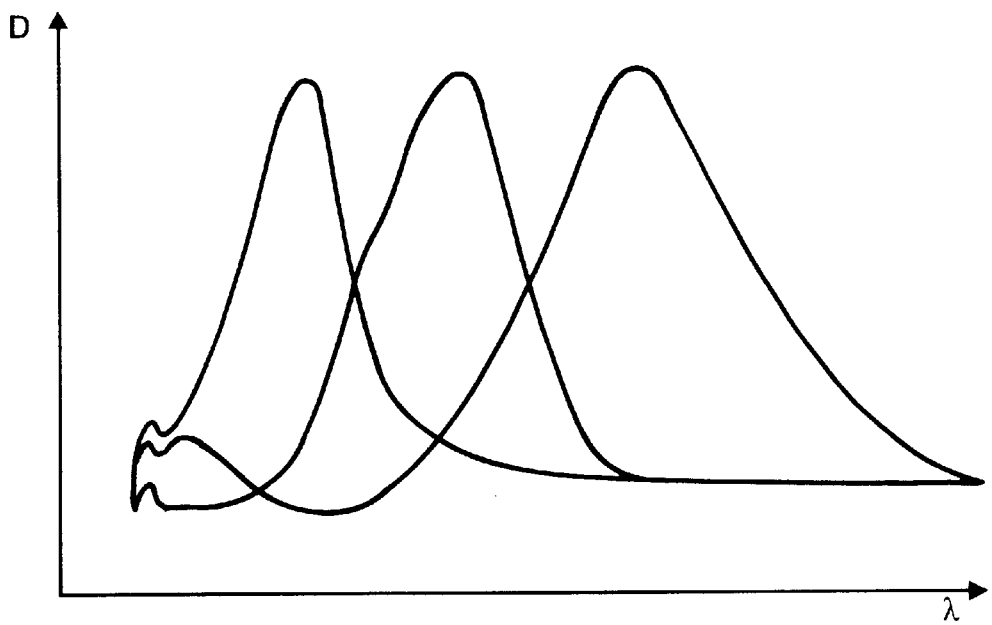
FIG. 5 is a schematic graph of the spectral density characteristics of the dyes used in a typical cinematographic film.

FIG. 5 shows the diffuse spectral density D with wavelength $\lambda$ for three coloured dyes used in cinematographic film across the visible spectrum (approximately 400 nm to 750 nm). The peaks shown are at 450 nm for the blue dye, 540 nm for the green dye and 660 nm for the red dye. It is common for colour films to comprise three dyes each corresponding to a given colour, usually red, green and blue (see for example "Reproduction of Colour" by R. W. G. Hunt, Fountain Press, ISBN 085242356X).

Figure 6:
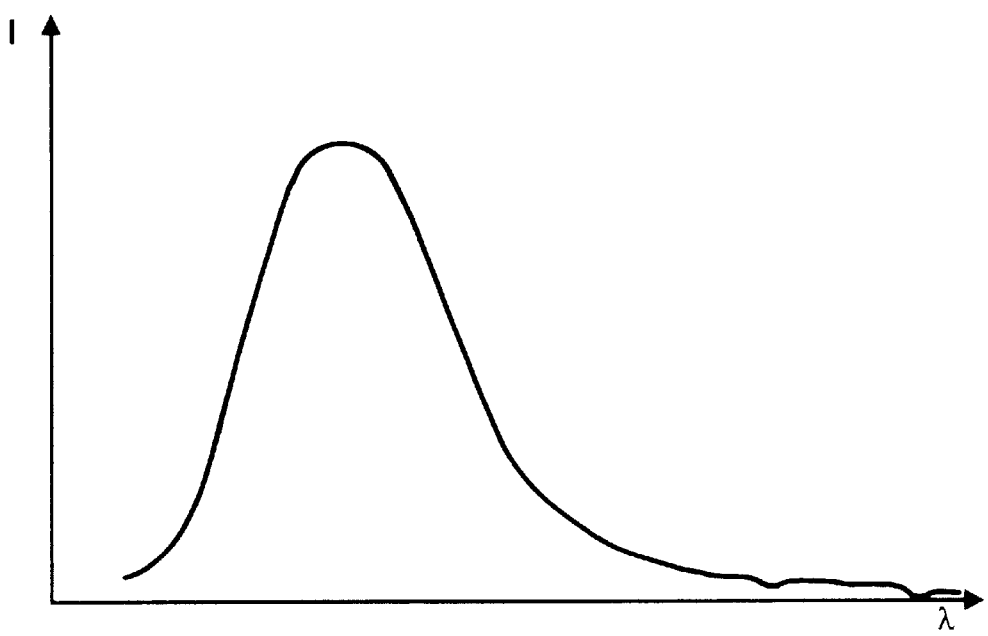
FIG. 6 is a schematic graph of the emission characteristics of a single phosphor.

FIG. 6 shows the intensity I of light emitted by a single phosphor of a CRT versus wavelength $\lambda$ across the visible spectrum. An example of such a phosphor is the X3 phosphor manufactured by Rank Brimar Limited of Manchester, England which is used by Cintel International Limited in the URSA range of telecine machines. The phosphor shown in FIG. 6 has a peak of intensity at 510 nm and thus the light from this phosphor appears yellowish green. It can be seen from a comparison of FIGS. 5 and 6 that the single phosphor will provide greater illumination of the green dyed regions of the film, rather than the red or blue dyed regions. Thus at 450 nm the intensity of the phosphor is approximately 10% of its peak value; at 540 nm the intensity is approximately 80% of its peak value; and at 660 nm the intensity is approximately 5%. The result of the low intensity of the red and blue light from the single phosphor is a low signal-to-noise ratio (SNR) in the red and blue video signals, because the overall intensity of light produced by the single phosphor in the red and blue regions is relatively small in relation to the ambient noise levels.

Figure 7:
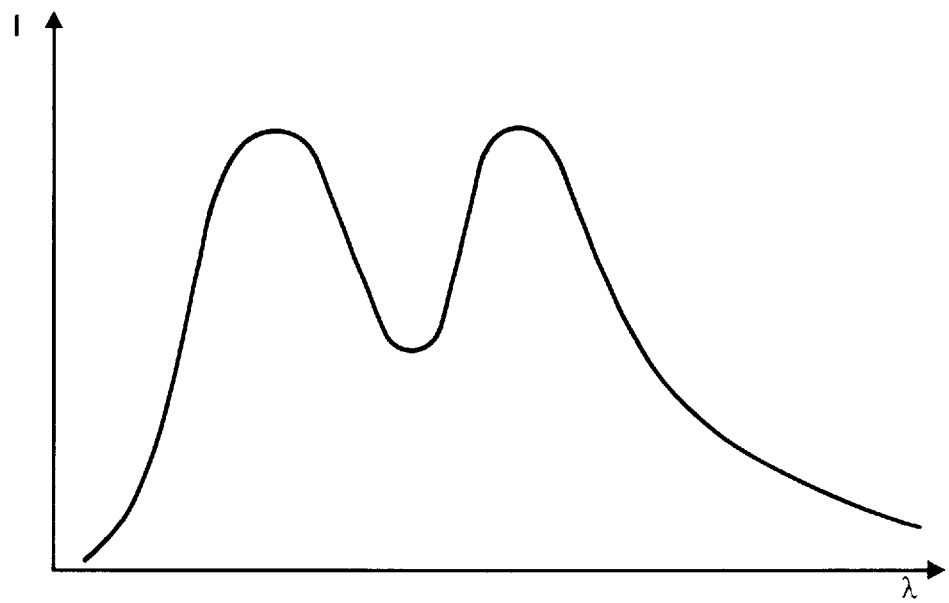
FIG. 7 is a schematic graph of the emission characteristics of a mixed phosphor.

FIG. 7 shows a schematic graph of intensity I versus wavelength λ for a mixed phosphor, composed of a mixture of two phosphors with distinct spectral characteristics. An example of such a phosphor is the A7, A8 or F52 phosphors manufactured by Rank Brimar Limited. As can be seen from FIG. 7, the mixed phosphor has two peaks of intensity at 400 nm and 570 nm giving an improved intensity level across the majority of the visible spectrum relative to the single phosphor of FIG. 6. Thus the light output in the read and blue regions is greatly improved compared to the single phosphor. As more light is produced by the mixed phosphor in these regions, more light passes through the scanned film and thus the SNR of the red and blue video signals is higher compared to that for a single phosphor. However, mixed phosphors have not generally been used in telecine applications as each of the two phosphors will have a different granularity, such that the light from the face of the CRT will be uneven not only in intensity but also in colour composition.

Figure 8:
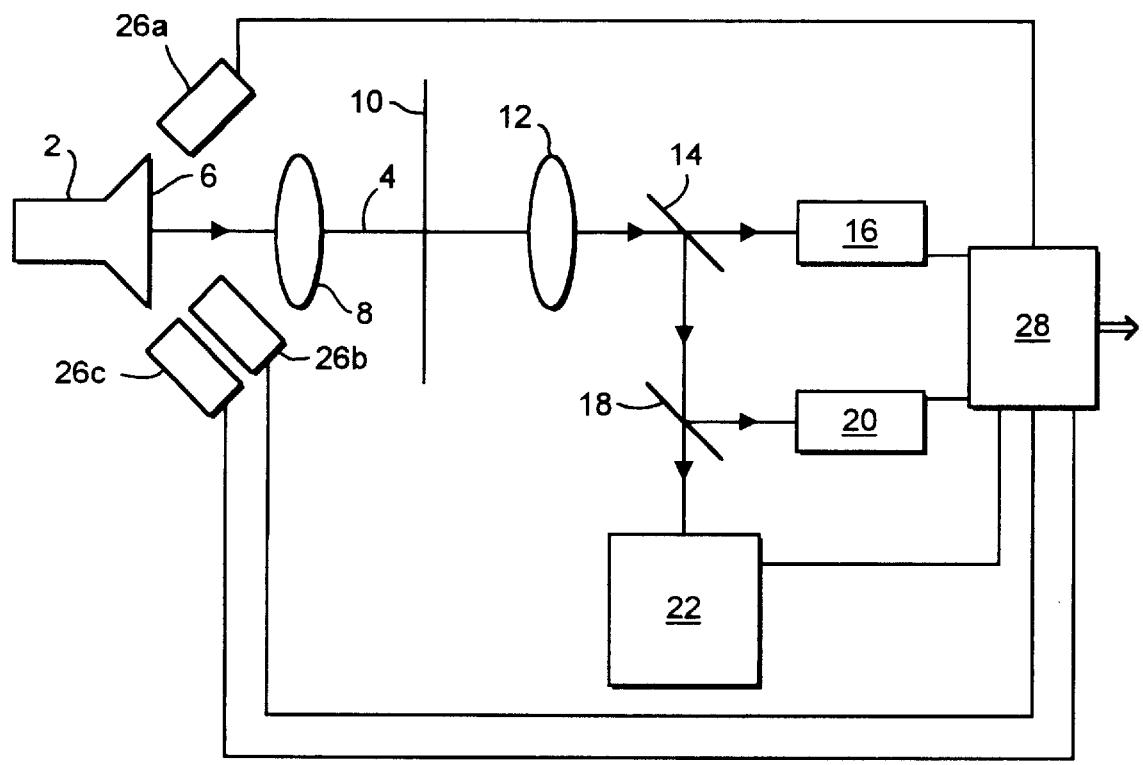
FIG. 8 is a schematic representation of a first embodiment of the present invention.

FIG. 8 shows a telecine system according to the invention, some features of which correspond to the features of the prior art system of FIG. 1 and will not therefore be described again in detail. The system comprises three secondary photodetectors 26a–c which are directed at the face 6 of the CRT 2. Each secondary photodetector 26 is provided with a respective filter so that each secondary photodetector is responsive only to either red, green or blue light. Thus the secondary photodetectors 26 produce secondary electrical signals corresponding to the intensity of the light from the CRT 2 before it is attenuated by the film 10. The secondary signals from the secondary photodetectors 26 are fed to a processing unit 28 which also receives the primary signals from the primary photodetectors 16, 20 and 22. In the processing unit 28, each primary colour component signal is divided by the corresponding secondary signal from the respective secondary photodetector 26.

Figure 9A:
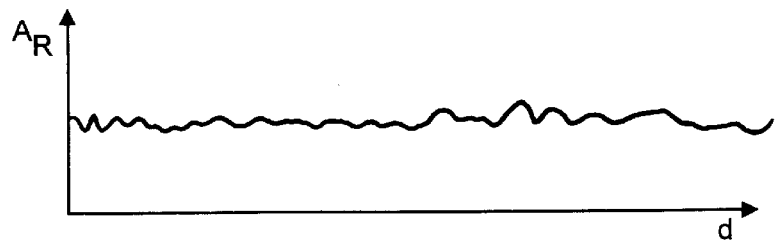
FIGS. 9a to 9c are schematic graphs showing the variation of light intensity with distance across the face of the CRT for each of the secondary photodetectors of the embodiment of FIG. 8.
Figure 9B:
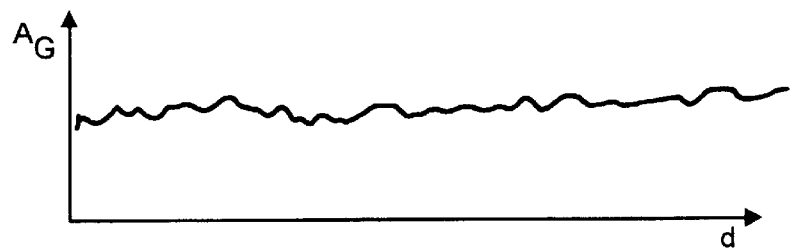
Figure 9C:
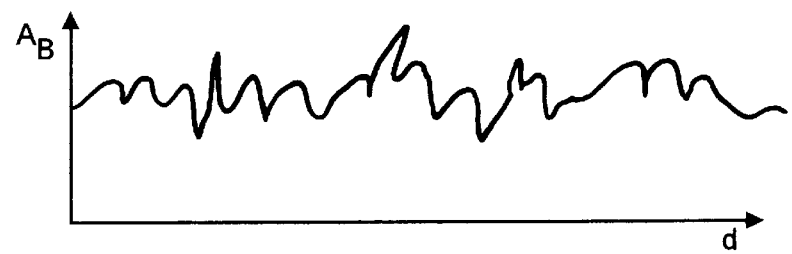

The amplitudes $A_R$, $A_G$ and $A_B$ of the secondary signals from each of the secondary photodetectors 26a, 26b and 26c respectively are shown in FIGS. 9a to 9c against the distance d of the scanning spot across the face of the CRT. As can be seen, the amplitudes $A_R$ and $A_G$ of the correction signals from the red secondary photodetector 26a and the green secondary photodetector 26b vary substantially similarly, as the grain of the phosphor component of the mixed phosphor that produces these colour components is relatively small. However, greater variation is seen in the amplitude $A_B$ of the blue secondary signal from the blue secondary photodetector 26c as the grains of the blue phosphor component of the mixed phosphor are relatively large. Thus, the secondary signals for the three colour components are processed independently such that the effect of the differential grain size of the phosphor components making up the mixed phosphor is compensated.

Figure 10:
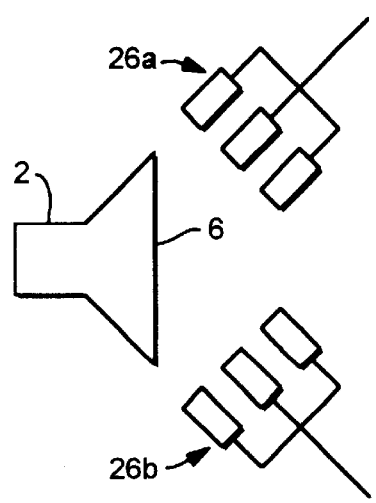
FIG. 10 is a schematic representation of a detail of a second embodiment of the present invention.

FIG. 10 shows part of a second embodiment of the present invention in which each of the secondary photodetectors 26a–26c is made up of three individual photodetectors (the blue photodetector 26c is not shown in this figure for reasons of clarity).

It will be seen from the foregoing that the invention provides a telecine system in which the CRT is provided with a mixed phosphor and the effect of the differential grain of the mixed phosphor is compensated using additional colour responsive photodetectors which detect the light from the CRT before it is modulated by the film. Desirably, at least one phosphor component of the mixed phosphor has a peak emission at a wavelength of less than 500 nm and/or at least one phosphor component of the mixed phosphor has a peak emission at a wavelength of greater than 550 nm.

We claim:

1. Apparatus for the conversion of colour film images to corresponding electrical signals, the apparatus comprising:

a cathode ray tube which is provided with a phosphor for producing light, the phosphor being composed of at least two phosphor components, each phosphor component having a distinct spectral output;

primary photodetector means arranged to detect the light produced by the phosphor of the cathode ray tube, after said light has been modulated by a film, said primary photodetector means further being arranged to produced primary electrical signals which include information about the colour content of the detected light;

secondary photodetector means arranged to detect light produced by the phosphor of the cathode ray tube, which light has not been modulated by the film, and to produce secondary electrical signals which include information about the colour content of the detected light corresponding to the emission from each phosphor component of said phosphor; and processing means for adjusting the primary electrical signals with reference to the secondary electrical signals.

2. The apparatus of claim 1, wherein the processing means is arranged to divide the primary signals by the secondary signals.

3. The apparatus of claim 1, wherein the primary and secondary electrical signals are synchronised.

4. A method of converting colour film images to corresponding electrical signals, the method comprising the steps of:

providing a cathode ray tube having a phosphor for producing light, the phosphor being composed of at least two phosphor components, each phosphor component having a distinct spectral output;

modulating light produced by the phosphor of the cathode ray tube with a film;

converting the modulated light to primary electrical signals which include information about the colour of the modulated light;

converting light from the phosphor of the cathode ray tube which has not been modulated by the film to secondary electrical signals including information about the colour of the unmodulated light; and modulating the primary electrical signals with the secondary electrical signals.

5. Apparatus for the conversion of colour film images to corresponding electrical signals, the apparatus comprising:

a cathode ray tube which is provided with a phosphor for producing light, the phosphor being composed of at least two phosphor components, each phosphor component having a distinct spectral output;

primary photodetector means arranged to detect the light produced by the phosphor of the cathode ray tube, after said light has been modulated by a film, said primary photodetector means further being arranged to produce primary electrical signals which include information about the colour content of the detected light;

secondary photodetector means arranged to detect light produced by the phosphor of the cathode ray tube, which light has not been modulated by the film, and to produce secondary electrical signals which include information about the colour content of the detected light corresponding to the emission from each phosphor component of said phosphor, the secondary photodetector means comprising a plurality of photodetectors, each said photodetector being arranged to detect the intensity of a particular spectral region of light; and processing means for adjusting the primary electrical signals with reference to the secondary electrical signals.

6. The apparatus of claim 5 wherein the secondary photodetector means comprises a respective photodetector responsive to each of red, green and blue light.

7. Apparatus for the conversion of colour film images to corresponding electrical signals, the apparatus comprising:

a cathode ray tube which is provided with a phosphor for producing light, the phosphor being composed of at least two phosphor components, each phosphor component having a distinct spectral output, and at least one phosphor component having a peak emission in the blue region of the spectrum;

primary photodetector means arranged to detect the light produced by the phosphor of the cathode ray tube, after said light has been modulated by a film, said primary photodetector means further being arranged to produce primary electrical signals which include information about the colour content of the detected light;

secondary photodetector means arranged to detect light produced by the phosphor of the cathode ray tube, which light has not been modulated by the film, and to produce secondary electrical signals which include information about the colour content of the detected light corresponding to the emission from each phosphor component of said phosphor; and processing means for adjusting the primary electrical signals with reference to the secondary electrical signals.

8. A method of converting colour film images to corresponding electrical signals, the method comprising the steps of:

providing a cathode ray tube having a phosphor for producing light, the phosphor being composed of at least two phosphor components, each phosphor component having a distinct spectral output, and at least one phosphor component having a peak emission in the blue region of the spectrum;

modulating light produced by the phosphor of the cathode ray tube with a film;

converting the modulated light to primary electrical signals which include information about the colour of the modulated light;

converting light from the phosphor of the cathode ray tube which has not been modulated by the film to secondary electrical signals including information about the colour of the unmodulated light; and modulating the primary electrical signals with the secondary electrical signals.

9. The method of claim 8 wherein the primary signals are modulated by the secondary signals to compensate for the grain size of the blue phosphor.

* * * * *